July 19, 1955  A. F. MARSH  2,713,323
BREEDING CAGE AND PEN FOR SMALL ANIMALS
Filed Nov. 10, 1950  2 Sheets-Sheet 2
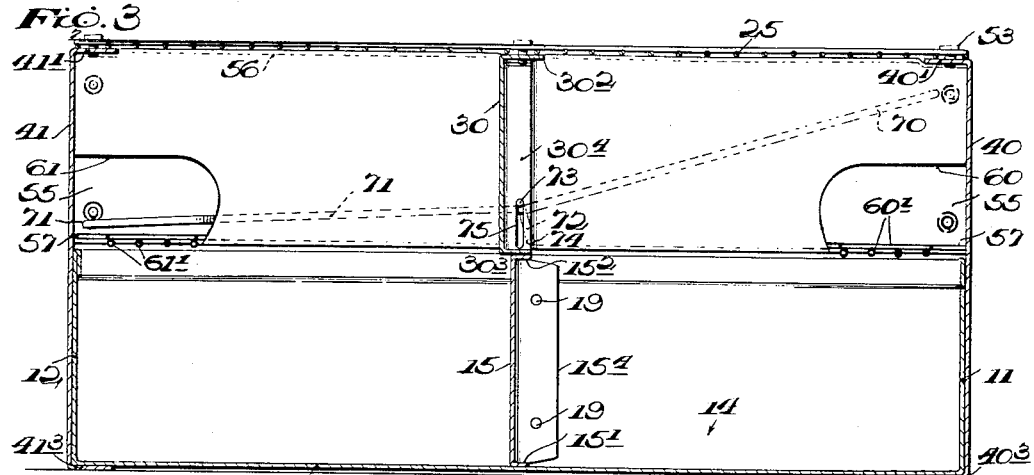
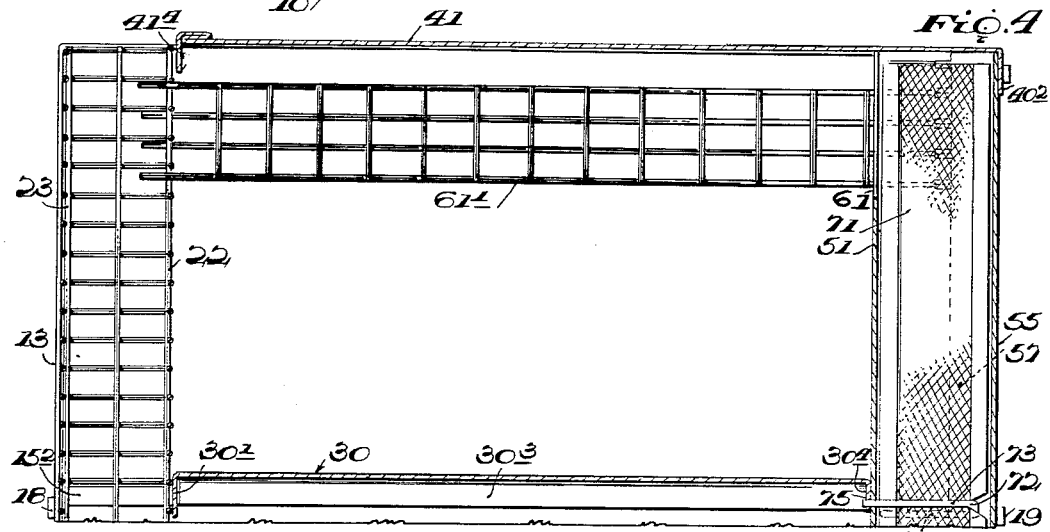
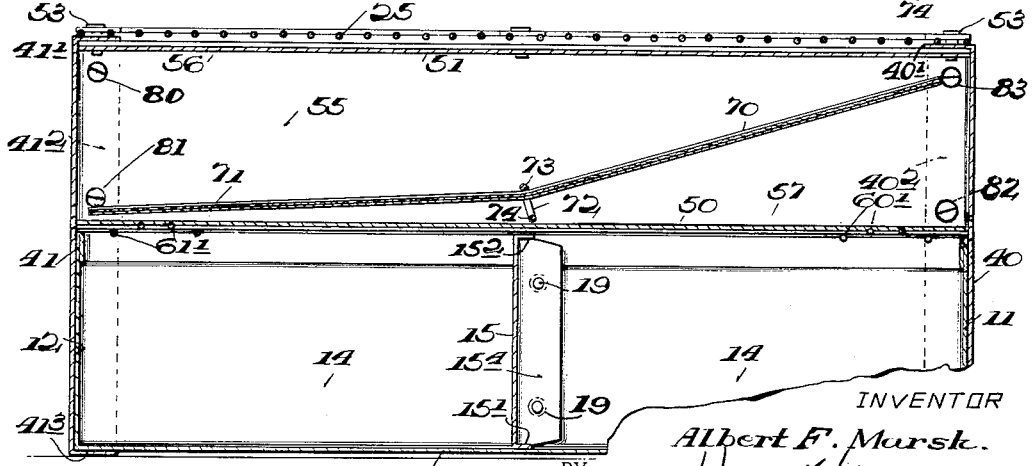
INVENTOR
Albert F. Marsh
BY
ATTORNEY

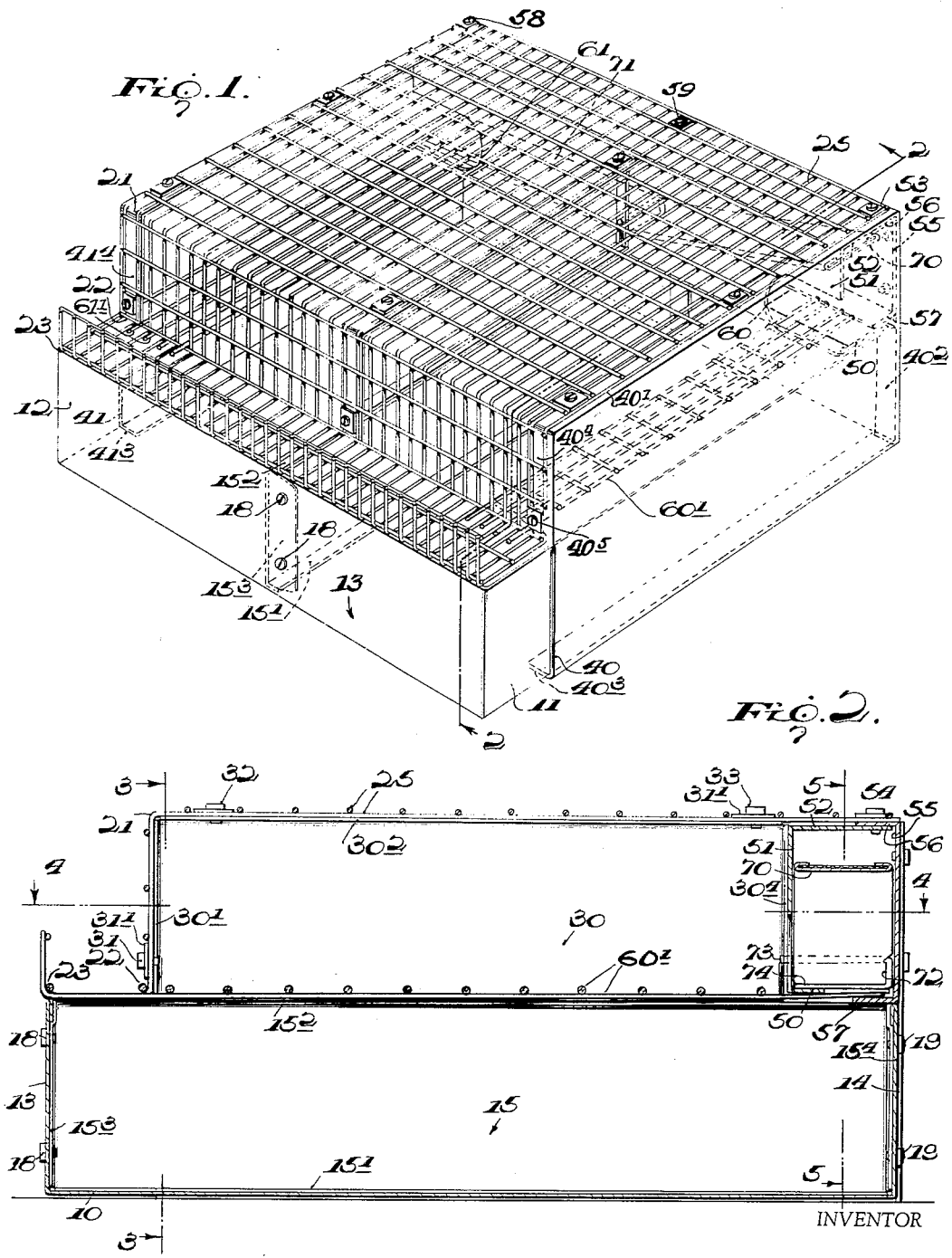

2,713,323

BREEDING CAGE AND PEN FOR SMALL ANIMALS

Albert F. Marsh, Mobile, Ala.

Application November 10, 1950, Serial No. 195,039

5 Claims. (Cl. 119—17)

This invention is in pens for animals, and specifically it is a pen intended for the breeding of hamsters.

The breeding of hamsters poses certain problems which, if not unique, are at least uncommon in animal husbandry. The female of the species is often larger and more powerful than the male, and she is, moreover, apt to be intractable and even savage in the presence of the male except at certain intervals for rather brief periods.

It is possible, of course, to raise hamsters by placing a number of males and females together in a large pen; the females will reach breeding condition from time to time and will then be impregnated by the males, who, at other times, will find it possible to escape among the other animals in the pen. Breeding under such conditions is, however, rather fortuitous.

Some breeders, on the other hand, prefer to practice selective breeding in order to strengthen and stabilize various characteristics in the animals. This presents a time-consuming problem except where very few animals are involved since the breeder must stand by, after placing the selected animals together, in order to remove a valuable male, should the female not be ready, to protect him from injury by the female; it may be necessary to try the two animals together many times before they can successfully be bred.

The principal object of the present invention is to provide means whereby selective breeding of hamsters and such animals can be practiced without human attendance and without danger of injury to valuable stock.

More specifically, it is an object of the invention to provide a cage or pen for (preferably) two animals with means whereby one can readily escape the other, and yet can return at will.

Another object is to provide a pen of the nature mentioned wherein the escape-and-return means is automatically constantly reset so that it can be used time after time without the necessity of human attendance.

An additional object of the invention is to provide for animals a pen divided into two parts with a passage therebetween, the passageway being closable by the first animal therethrough.

A further object of the invention is to provide an animal cage of the type described having desirable characteristics of demountability and portability.

Other objects will be apparent from a reading of the following specification and claims.

In the drawings:

Figure 1 is an isometric view of the cage of my invention taken from the right front thereof (as one faces the cage);

Figure 2 is a sectional view taken on the line 2—2 of Figure 1; and

Figures 3, 4, and 5 are sectional views taken respectively on lines 3—3, 4—4, and 5—5 of Figure 2. Figure 4 is, however, taken through but one-half of the cage.

With reference to the drawings, the pen can be seen to consist in its preferred form of two principal components, a bottom member and a top member.

The bottom member is in the nature of a rectangular pan having a bottom 10, sides 11 and 12, a front 13, and a back 14. In the form shown, this pan is soldered at the corners, although this is largely a matter of preference.

A rectangular partition 15, having flanges $15^1$, $15^2$, $15^3$, and $15^4$, divides the pan or tray from front to back into two equal compartments; it is secured by screws, as 18 and 19, to the front 13 and back 14, respectively, thereof.

The top member of the pen is formed largely of wire mesh 25 which is flat for the greater part of its extent, but at a short distance from the front (of the pen) is bent downwardly, at 21, then level again, at 22, and upwardly, at 23, to provide a trough-like effect. The entire extent of the mesh is such as substantially to cover the aforementioned pan or tray 10–14, and it can be seen that in the completed pen the elements are in fact superimposed. The trough serves to support certain types of feeding and watering devices (not shown).

The mesh top also is partitioned centrally, from point 21 nearly to its back edge, by member 30, with flanges $30^1$, $30^2$, $30^3$, and $30^4$, and flanges $30^1$ and $30^2$ are secured to the wire by means of screws, as 31, 32, and 33, and cooperating washers, as $31^1$.

The top portion of the pen is also provided with side members 40 and 41. Side 40 is in length substantially equal to the wire mesh (excepting the trough) and is as deep as the entire pen when the parts are superimposed. It has a top flange $40^1$, a back flange $40^2$, and a bottom flange $40^3$, and in front there is a flange $40^4$ which extends from the mesh top downwardly substantially to the bottom pan or tray. Flanges $40^1$ and $40^4$ are secured by screws, as $40^5$, to the wire mesh. The other side member corresponds in formation to that just described.

At the rear of the cage may be seen (Figure 2) a U-shaped channel member consisting of elements (or flanges) 50, 51, and 52. This member, which may hereinafter be referred to as a passage, in length corresponds to the width of the cage.

Preferably, the passage has no contact with or support from the pan or tray member or from its partition 30, but is rather hung from the upper mesh and from the side members 40 and 41 (or their upper flanges) by means of screws 53, 58, and 59.

The back of the pen is then closed by a channel member comprising a back surface 55, an upper flange 56, and a lower flange 57. This member fits outside of flanges 50 and 52 of the U-shaped passage just above-described and within the flanges of the side members, as $40^2$, and is fastened in place by screws, as 53, 58, and 59. Lower flange 57 offers additional support to passage 50—52.

The passage is provided with two openings 60 and 61, each of such size as to admit the animal for which the cage is intended. Entrance to opening 60 is afforded from the bottom of the pen by means of a mesh strip or walk $60^1$, one end of which is supported by the wire mesh 25 adjacent the point 22, while the other end is supported by flange 57 of channel member 55–57.

As shown in the drawings, the walks $60^1$ and $61^1$ are held in place merely by springing some of their longitudinal members beneath their supporting wire while others of the longitudinal members are placed on top of the wire (see Figure 4), and, at the rear of the pen, certain of the longitudinal elements are located above and others are below flange 57. This arrangement is simple and yet secure; but other fastening means can, of course, be utilized.

Furthermore, it should be understood that the elevated walks $60^1$ and $61^1$ of the preferred embodiment are especially adapted for small agile animals, such as hamsters. For other animals, inclined ramps may be employed, and still further expedients are possible.

Within the passage is a treadle, not flat (in elevation) but of a shallow V formation, including arms 70 and 71, the whole being of such dimensions as to reach substantially from one end of the passage to the other. It will be seen that the central portion of the treadle does not rest upon the bottom 50 of the passage, but instead is supported spaced therefrom by a wire hinge or fulcrum of U shape (having a back portion 72, an upper leg 73, and a lower leg 74), which is retained in proper position by extending the upper leg 73 thereof through member 51, as at 75 (Figure 3). The fulcrum is secured to the treadway by soldering or in some other convenient fashion. In the embodiment shown, the leg 73 of the hinge passes over the top of the treadle 70—71 and is soldered thereto.

The U-shaped wire hinge or fulcrum performs dual functions. The upper leg 73 serves as a pintle for the treadle while the lower leg 74 may be said to provide a certain amount of friction opposing oscillation of the treadle. This latter function is not significant in some constructions, as it is related to the size, weight, and fundamental friction of the various parts, the weight of the animals involved, etc.; but, when the parts are small and light in weight, a conventionally-mounted balanced treadle has an objectionable tendency to bounce. According to the illustrated embodiment, the weight of even a small animal is enabled to overbalance the treadle, and (at almost the same time) the treadle is lifted as leg 74 of the hinge passes beneath leg 73; it is this necessary raising of the treadle as it passes from one position to the other that inhibits rebound.

The operation of the pen is readily apparent, and will be but briefly described.

If one of two animals housed in one side of the pen is attacked, or for any other reason wishes to escape, it merely jumps or climbs onto an elevated walk, $61^1$, for example, and crawls through opening 61, onto the treadle arm 71 (assumed, as in the drawings, to be the "down" arm). It continues along the treadle, and almost immediately over-balances the same by its own weight so that arm 70 drops down, giving it access to opening 60, walk $60^1$, and the opposite side of the cage. The dropping down of the arm 70 lifts arm 71 and so, of course, blocks the passage to any following animal. The treadle remains in its new position so that the first animal may return whenever it desires. In the embodiment shown, it will be understood, the raising of a treadle does not block any opening to the passage, but instead blocks the passage itself.

The sizes and positions of the openings and other parts are determined so as to inhibit entrance to the passage and thus to the treadle, although once the treadle is reached, it can be quickly overbalanced. The arrangement thus provides the escaping animal with certain advantages in view of the initiative which is his. Under some circumstances, as perhaps, with animals less quick and agile, entrance to the passage can be facilitated without departing from the spirit of the invention.

It will be noticed that the top member of the cage is not secured by screws or otherwise to the bottom member, and this makes it possible to slide the two parts relative to each other from front to back while the bottom flanges of the side elements, as $40^3$, prevent the two members from being lifted apart. In use, the cage is preferably secured through the upper portion of its back side, as by screws 80, 81, 82, and 83 (see Figure 5), to a wall or some other vertical support; under these conditions the lower tray or box member can be slid forward to give access to the space below the wire mesh for cleaning and feeding, and for removal and replacement of animals.

The pen is especially adapted for shipping in knocked-down form, with final assembly being effected by the purchaser through the punching of a few holes and the insertion of about one dozen (preferably) self-tapping screws. The packaging also of the disassembled pen is very simple, as all of the parts fit conveniently into the pan or tray member and can be shipped without elaborate packing.

It may be noted that in the drawings the thicknesses of various parts of the pen are exaggerated, and that it is, therefore, not possible to show precisely how the various elements fit together. Actually, the sheet metal used is comparatively light and somewhat flexible, and self-tapping screws are quite sufficient to pull the parts snugly together.

The foregoing description should not be considered to be limitative, and it should be understood that I consider my invention to be of such breadth as to cover all changes and modifications of the example herein chosen for purposes of disclosure which do not constitute departures from the spirit and scope of the invention.

I claim:

1. An animal pen including a floor, partitioning means dividing the pen into two compartments, a substantially enclosed passage within said pen proper having a floor substantially transversely positioned relative to said partitioning means and spaced-apart openings therein communicating with the said two compartments above the level of said floor, and a treadle having two ends in said passage said treadle being supported adjacent its center for frictionally-inhibited oscillation about its support to bring the ends thereof alternatively into contact with the floor of said passage and thereupon alternatively to communicate with said openings.

2. In an animal pen having a floor level, partitioning means dividing the pen into two compartments, a raised passage having a floor between the said compartments communicating therewith above the said floor level, a treadle in said passage substantially coextensive in length therewith, the said treadle being of a shallow V formation in elevation the said treadle being supported substantially at its vertex above the floor of said passage for substantial stability when either end thereof is in contact with the floor of said passage, and walks between each compartment of said pen and said passage and each with one end of said treadle.

3. In an animal pen, a bottom member in the nature of a tray having a floor, a front, a back, two sides, and a partition dividing the tray into two compartments; a top member, two side members having flanges at their lower edges for supporting said bottom member in sliding relation thereto, a partition analogous to the first-mentioned partition and slidably engageable therewith, and a substantially enclosed passage communicating with both sides of said partition above the floor of said bottom member, and a treadle therein, a support for said treadle located substantially at the midlength thereof passing through a wall of said passage the opening therefor allowing for vertical and rotatory movement of said support, and a member substantially parallel to and beneath said support and fixed thereto the said member supporting the said treadle at its said midlength spaced from the floor of said passage.

4. The invention of claim 3 further characterized in having the said top proper disposed downwardly adjacent the front of the pen, then forwardly, and then upwardly, to form a trough, the said trough being formed substantially of mesh.

5. The invention of claim 3 further characterized in having the said top proper formed substantially of mesh, and having said mesh disposed downwardly adjacent the front of the pen, then forwardly, and then upwardly, to form a mesh trough.

References Cited in the file of this patent

UNITED STATES PATENTS

| | | |
|---|---|---|
| 587,255 | Anderson | July 27, 1897 |
| 1,229,164 | Stith | June 5, 1917 |
| 1,462,107 | Holman | July 17, 1923 |
| 2,578,247 | Hofferbert | Dec. 11, 1951 |
| 2,578,762 | Torgeson | Dec. 18, 1951 |